United States Patent
Adrial et al.

(10) Patent No.: US 6,622,922 B1
(45) Date of Patent: Sep. 23, 2003

(54) MICRO-ELECTRONIC COMPONENT, INCORPORATING ASYNCHRONOUS DIGITAL PROCESSING MEANS AND A CONTACT-FREE ELECTROMAGNETIC COUPLING INTERFACE

(75) Inventors: André Adrial, Le Versoud (FR); Jacky Bouvier, Meylan (FR); Patrice Senn, Grenoble (FR); Marc Renaudin, Biviers (FR); Pascal Vivet, Grenoble (FR)

(73) Assignees: France Telecom, Paris (FR); Institut National Polytechnique de Grenoble, Cedex (FR); Centre National de la Recherche Scientifique, Cedex (FR)

( * ) Notice: Subject to any disclaimer, the term of this patent is extended or adjusted under 35 U.S.C. 154(b) by 0 days.

(21) Appl. No.: 09/629,686

(22) Filed: Aug. 1, 2000

(51) Int. Cl.⁷ ............................................. G06K 19/06
(52) U.S. Cl. ................. 235/492; 235/380; 235/493
(58) Field of Search .................... 235/492, 380, 235/493

(56) References Cited

U.S. PATENT DOCUMENTS

| | | | | |
|---|---|---|---|---|
| 5,326,965 A | * | 7/1994 | Inoue ........................... | 235/492 |
| 5,359,323 A | | 10/1994 | Michel .................. | 340/825.54 |
| 5,382,778 A | * | 1/1995 | Takahira et al. ............. | 235/380 |
| 5,668,803 A | | 9/1997 | Tymes et al. ................ | 370/312 |
| 5,670,772 A | * | 9/1997 | Goto ............................ | 235/493 |
| 5,841,123 A | | 11/1998 | Thorigne et al. ............ | 235/492 |
| 5,854,480 A | * | 12/1998 | Noto ............................ | 235/492 |
| 5,874,725 A | * | 2/1999 | Yamaguchi .................. | 235/492 |
| 5,949,826 A | * | 9/1999 | Liyama et al. ............... | 375/279 |
| 6,003,776 A | * | 12/1999 | Drupsteen .................... | 235/492 |
| 6,070,804 A | * | 6/2000 | Miyamoto .................... | 235/494 |
| 6,111,552 A | * | 8/2000 | Gasser ......................... | 343/873 |
| 6,119,945 A | * | 9/2000 | Muller et al. ................ | 235/492 |

FOREIGN PATENT DOCUMENTS

| | | |
|---|---|---|
| EP | 0 680 002 | 11/1995 |
| FR | 2 735 929 | 12/1996 |

OTHER PUBLICATIONS

Meng, "Design of Closck–Free Asynchronous System for Real–Time Signal Processing", 1989. ICASSP–89., 1989 International Conference on, May 23–26, 1989, pp. 25332–2535 vol. 4.*

(List continued on next page.)

*Primary Examiner*—Michael G. Lee
*Assistant Examiner*—Seung H Lee
(74) *Attorney, Agent, or Firm*—Christie, Parker & Hale, LLP

(57) ABSTRACT

A micro-electronic component for a portable object is of the type which incorporates digital processing means, and an interface for contact-free electromagnetic coupling with a remote station. The digital processing means can operate according to an operating mode of the request/acknowledgement type, which is substantially insensitive to the propagation time, without a global, regular clock. The component additionally comprises adapter means, which can adapt the signals of the contact-free interface to the signals of the digital processing means and vice versa, in order to permit two-way dialogue with the remote station.

4 Claims, 5 Drawing Sheets

OTHER PUBLICATIONS

Yeandel, "An On–Line Testable UART Implemented Using IFIS", VLSI Test Symposium, 1997., 15th IEEE, Apr. 27–May 1, 1997, pp. 344–349.*

Datasheet: "PC16550D Universal Asynchronous Receiver/Transmitter With FIFOs" National Semiconductor; Jun. 1995; pp. 1–10; National Semiconductor Corporation; U.S.A.

M. Renaudin, et al., "AAAA: asynchronisme et adéquation algorithme architecture", Traitement du Signal, vol. 14, No. 6, 1997, pp. 589–604.

Y. Thorigne et al., "Nouvelle technologie de la carte a memoire: la carte sans contact", L'echo 4 trimestre 1994, pp. 43–48, des RECHERCHES No. 158.

J. Bouvier et al., "A Smart Card CMOS Circuit with Magnetic Power and Communications Interface", IEEE International Solid State Circuits Conference, 1997, pp. 296–297, ISSCC97/Session 17/TD:Low–Power/LowVoltage Circuits/Paper SA 17.6.

M. Renaudin et al., "ASPRO–216: a Standard–Cell Q.D.I. 16–Bit RISC, Asynchronous Microprocessor", IEEE, 1998, pp. 22–31.

* cited by examiner

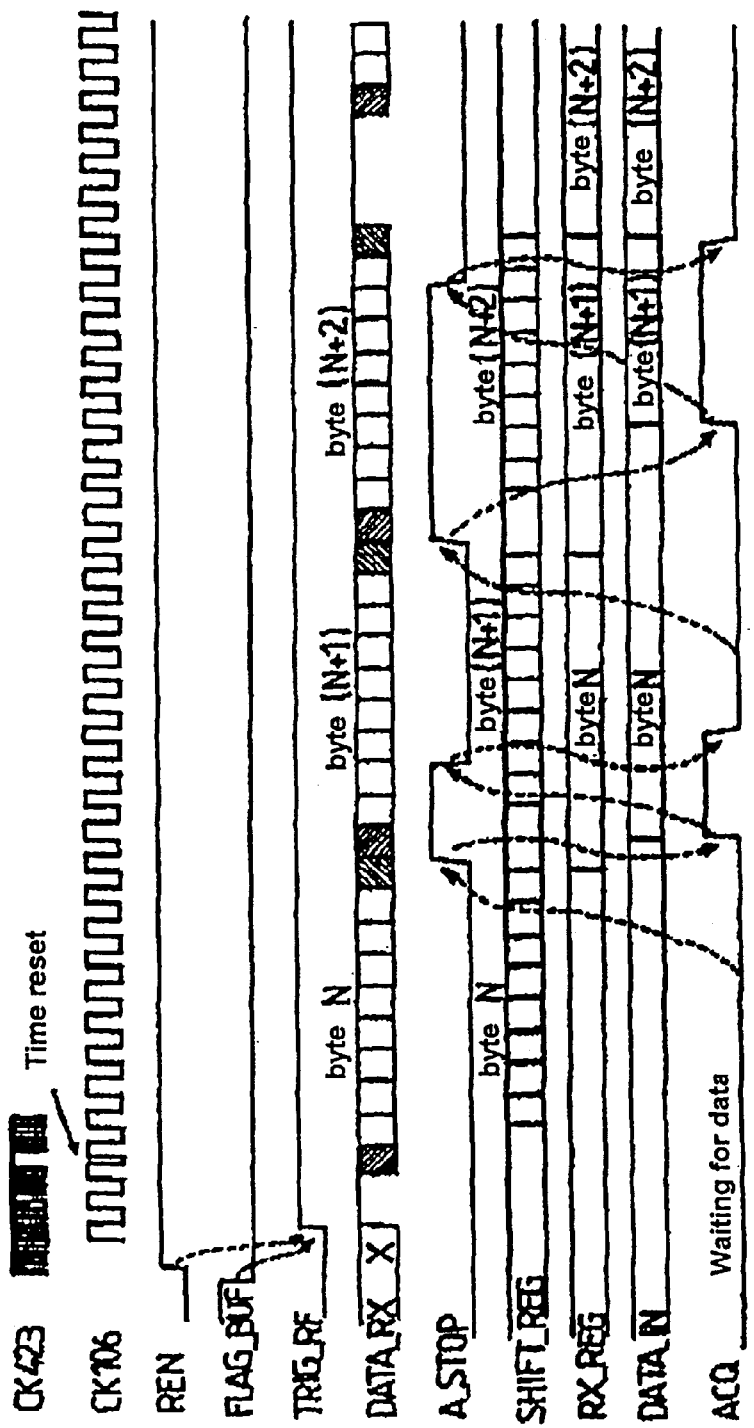

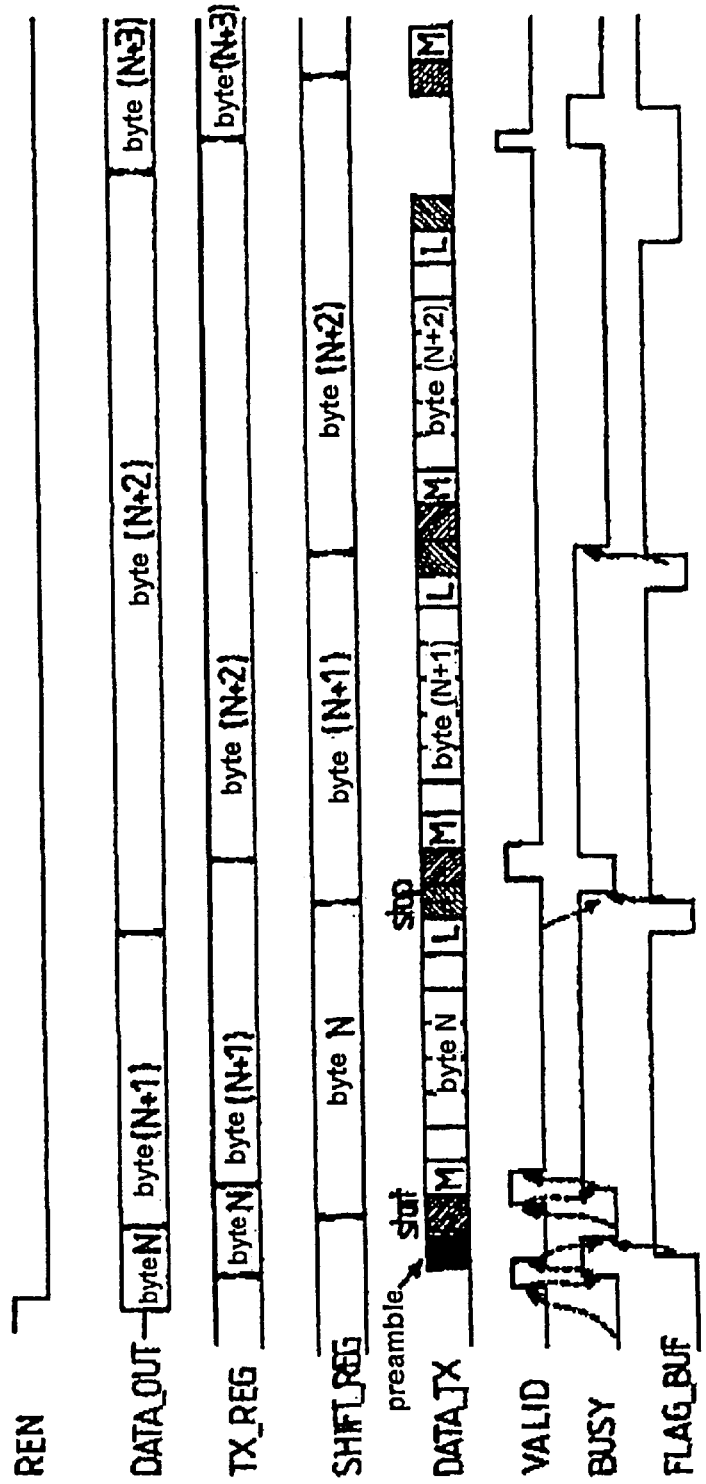

MICRO-ELECTRONIC COMPONENT, INCORPORATING ASYNCHRONOUS DIGITAL PROCESSING MEANS AND A CONTACT-FREE ELECTROMAGNETIC COUPLING INTERFACE

BACKGROUND OF THE INVENTION

The present invention relates to a micro-electronic component, incorporating asynchronous digital processing means and a contact-free electromagnetic coupling interface.

It belongs to the technical field of integrated micro-electronic components, and more particularly of circuits which incorporate clock-free microprocessors (which are also known as asynchronous), and contact-free (radio-frequency) electromagnetic coupling interfaces, which are used to supply to the elements of the component, and/or to transfer data by induction to a remote station.

It is applicable in autonomous sensors/actuators with integrated digital processing, telemetry systems (industrial and biomedical applications etc.), smart cards which incorporate a microprocessor or a dedicated circuit, portable objects which are used for access control, telephony or payment, with electromagnetic coupling with a remote station.

Micro-electronic components are already known which incorporate in the same circuit digital processing means and a contact-free electromagnetic coupling interface.

For example, in application FR-A-2 735 929, the applicant describes a smart card, the micro-electronic component of which incorporates all the functional elements of the smart card. A coil (also known as the antenna, self or inductive resistor) is integrated for supply by induction to the component and for inductive transfer of data to a remote station. In integrated technology, the component additionally comprises a module for rectification of the high-frequency alternating signal which is transferred by induction by the remote station, and a module for demodulation of the direct signal which is rectified by the module for rectification, in order to retrieve the data transmitted by the remote station. The component also incorporates a module for modulation of the alternating signal at the terminals of the coil, for transmission of data to the remote station. Finally, the component incorporates a memory, and means for reading/writing of data in said memory.

In a known micro-electronic component of this type, the means for reading/writing use logic with a clock, i.e. reading/writing of the data is timed by a global, regular clock, which is generally supplied by the remote station.

The disadvantage of logic of this type with a global, regular clock, consists in the fact that it needs the clock continually, in order to scan for the presence of data to be emitted or received. As a result, logic of this type with a clock dissipates energy unnecessarily, whereas this energy is generally the most critical resource in an autonomous portable object, and the consumption of which should advantageously be limited.

SUMMARY OF THE INVENTION

An object of the present invention is to eliminate the disadvantages referred to above.

It relates to a micro-electronic component for a portable object, of the type which incorporates digital processing means, and an interface for contact-free electromagnetic coupling with a remote station.

According to a general definition of the invention, the digital processing means can operate according to a operating mode of the request/acknowledgement type, which is substantially insensitive to the propagation time, and does not have a global, regular clock, and the component additionally comprises adapter means, which can adapt the signals of the contact-free interface to the signals of the digital processing means and vice versa, in order to permit two-way dialogue with the remote station.

According to the invention, clock-free logic provides many advantages compared with logic with a clock.

Firstly, control of the electrical activity of clock-free logic is more flexible, since only the availability of the data to be processed gives rise to processing, and thus to dynamic electrical consumption. The component according to the invention can thus be put on standby for data, without consuming energy.

Secondly, the power which is consumed by clock-free logic is lower, since only the parts of the asynchronous digital processing means which are involved in the processing consume power. The energy consumed thus reflects the complexity of the processing. On the other hand, in clock-type logic, all the parts of the integrated circuit consume energy during processing (with the exception of circuits with a controlled clock, the design of which is problematic).

Thirdly, functioning in relation to the supply voltage is more reliable in the component according to the invention. In fact, the component continues to be functional within a broad voltage range, and only the processing speed varies. Clock-free circuits thus operate at the maximum speed permitted by the supply voltage.

Fourthly, the supply control unit can carry out distribution of the energy available, by taking advantage of the operating reliability of clock-free circuits. For example, the control unit can give precedence to the contact-free interface supply, which is sensitive to variations in voltage, to the detriment of the supply to the clock-free digital part, which is insensitive to these variations.

Finally, fifthly, the adoption of clock-free circuits makes it possible to authorise processing during communications, since the risk of scrambling of the communication interface, caused by the emission of the electromagnetic circuit waves, is limited, because the said clock-free digital circuits have low electromagnetic emission.

According to a preferred embodiment of the invention, the contact-free interface comprises a coil for supply by induction to the component, and/or for inductive transfer of data to the remote station.

Advantageously, the coil is produced using flat integrated technology on the component.

Thus, the component according to the invention makes it possible to integrate on a single integrated circuit means for asynchronous digital processing, and a communication interface which can be coupled electromagnetically with a remote station, with all the passive elements of the contact-free interface (including the coil). However, the invention also applies to a coil produced according to the technology wherein a coil is assembled on the component.

Other characteristics and advantages of the invention will become apparent from the following detailed description, and from the drawings.

BRIEF DESCRIPTION OF THE DRAWINGS

FIGS. 7A to 7K represent timing charts which illustrate the transfer of data from the remote station to the portable object, according to the invention; and FIGS. 8A to 8H represent timing charts which illustrate the transfer of data from the portable object to the remote station, according to the invention.

DETAILED DESCRIPTION OF THE PREFERRED EMBODIMENT

The drawings contain elements of a specific nature. Consequently, they assist not only in making the description of the invention understood, but also, optionally, in defining the latter.

The remainder of the description is established on the basis of a portable object of the smart card-type, comprising a micro-electronic component. The smart card is designed to be connected electromagnetically (radio-frequency) with a remote station. The present invention also applies to any other portable object or the like.

The invention can advantageously be applied to a contact-free card with an integrated coil, in which the coil is etched directly onto the micro-electronic component, and mostly consists of silicon material. The present invention also applies to the technology of contact-free cards with an assembled coil, in which the antenna is produced on a substrate different from that of the electronic component.

Figure 1:
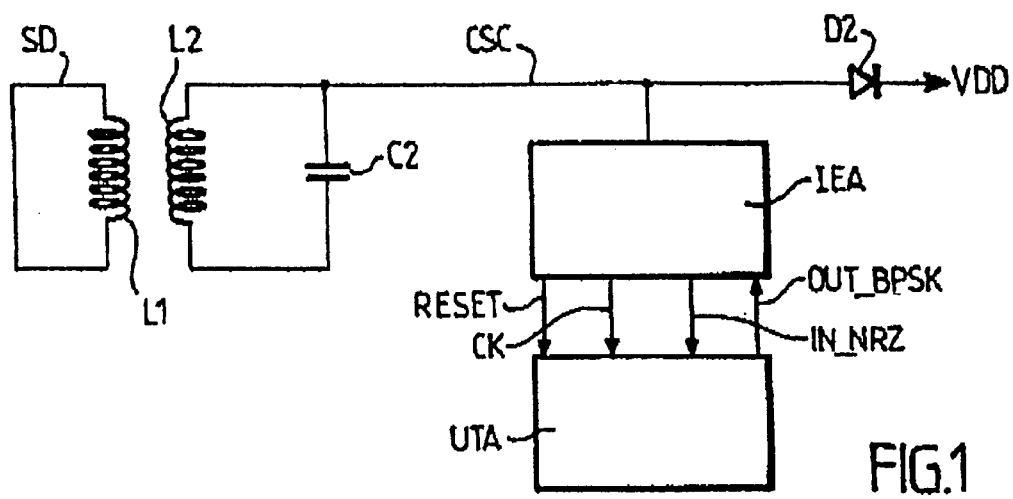
FIG. 1 shows an equivalent diagram of a contact-free card according to the state of the art.

With reference to FIG. 1, a contact-free smart card CSC according to the art is connected electromagnetically with a reader of a remote station SD. The remote station comprises an antenna L1, which can be connected electromagnetically to an antenna (inductive resistor or coil) L2 of the contact-free card CSC. The remote station is, for example, a Publiphone reader (registered trademark), and the contact-free card is, for example, a telephone Télécarte (registered trade mark).

A contact-free smart card is either active (in which case it contains an internal energy source), or passive (in which case it receives the energy it needs from the remote station). The present invention applies to these two types of cards, even though it is preferably destined for passive, contact-free cards.

The article in "L'ECHO DES RECHERCHES" (Reflection on Research) no. 158, 4th quarter 1994, "New smart card technology: the contact-free card", Yves THORIGNE, R. REITTER, and the article "A smart card CMOS circuit with magnetic power and communications interface" 1997 IEEE International Solid-State Circuits Conference, pages 296–297, J. BOUVIER, Y. THORIGNE, S. ABOU HASSAN, M. J. REVILLET, P. SENN, describe the operating principle of a contact-free smart card. Briefly, this principle is based on magnetic coupling of two tuned circuits, i.e. firstly the antenna L1, which is in the form of a solenoid, through which a current passes, and secondly the card, the magnetic dipole of which consists of the coils of the antenna L2. The inductive coupling is formed by the mutual inductance between these two circuits. The circuit of the card CSC is characterised by the inductive resistor L2, and the loss resistance (not shown).

The voltage which is induced in the inductive resistor L2 is rectified by a rectifier bridge (not shown), in order to constitute a supply voltage VDD, in the case of a passive, contact-free card.

Data is transmitted from the card CSC to the reader SD by load modulation, for example by means of a load resistor (not shown), which is switched at the rate of a bit stream OUT_BPSK, transmitted by processing means UTA, via an analogue electronic interface IEA.

For example, the analogue electronic interface comprises a transistor (not shown) which switches a resistive load (not shown), in order to modulate the value of the impedance which is brought in parallel, of the oscillating circuit of the card CSC. On the antenna L1 of the reader SD, this results in variation of impedance, which takes the form of modulation of amplitude of the voltage, at the terminals of the antenna L1.

Data can be transmitted from the reader SD to the card CSC by means of several types of modulation.

For example, the amplitude is modulated by acting directly on the emission of the voltage generator of the reader SD in the antenna L1 of the said reader. The demodulation in the card CSC is then carried out by envelope detection. If the same signal provides the remote supply and the transfer of data, the phase or frequency modulation can be used, as well as amplitude modulation which has a modulation value of 10% at the most, in order to make the system comply with standard ISO 14 443.

In a known manner, in integrated technology, the contact-free interface IEA comprises a rectification module (not shown) for the high-frequency alternating signal transferred by induction by the remote station SD, and a demodulation module (not shown) for the direct signal rectified by the rectification module, in order to supply a binary data reception signal IN_NRZ, which will be described in greater detail hereinafter.

Also in a known manner, in integrated technology, the contact-free interface IEA comprises a modulation module MODUL_BPSK for the alternating signal at the terminals of the coil L2, for transmission of data to the remote station SD. The said modulation module MODUL_BPSK, which will be described in greater detail hereinafter, supplies a data emission signal OUT_BPSK, of the type with modulation in phase of a subcarrier. Also in a known manner, in integrated technology, the contact-free interface IEA comprises clock recovery means (not shown), which are disposed at the output of the inductive resistor L2, in order to restore the alternating sinusoidal voltage which is present at the terminals of the inductive resistor L2.

FIGS. 2A to 2F show the signals of the contact-free communication interface IEA.

Figure 2A:
FIGS. 2A to 2F are timing charts which illustrate the signals of a radio-frequency interface of the contact-free card in FIG. 1.

With reference to FIG. 2A, the supply signal of the contact-free card goes into the active state when the energy recovery is established in the presence of an electromagnetic field (in this case pre-determined radio-frequency, obtained from the remote station).

Figure 2B:
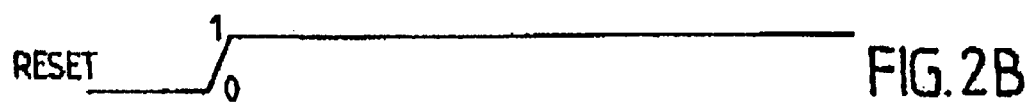

With reference to FIG. 2B, the reset signal RESET is active at 0. It is released (transition to 1) 10 microseconds after the supply signal VDD is established.

Figure 2C:
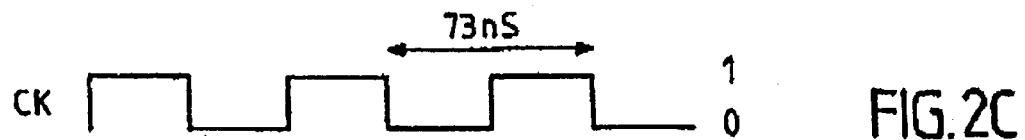

With reference to FIG. 2C, the clock signal CK recovered by the clock recovery means has a frequency of 13.56 MHz, i.e. a period of 73 ns.

Figure 2D:
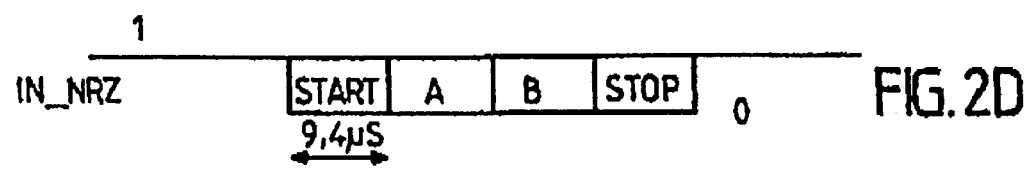

With reference to FIG. 2D, the data reception signal IN_NRZ (binary coding non-return to zero) is obtained from an amplitude modulation signal of the ASK (AMPLITUDE SHIFT KEYING) type, with a modulation rate close to 10%. The throughput is approximately 106 kbits/s. The period of a bit is 9.4 microseconds. The data transmission of a contact-free card as described with reference to FIG. 1 is asynchronous, of the series connection type, with a header or start bit, n data bits S, and a tail or stop bit. The transmission speed is, for example, 106 kbits/s. The transmission is in half-duplex. In the absence of reception of data, the line IN_NRZ is in the binary state 1.

Figure 2E:
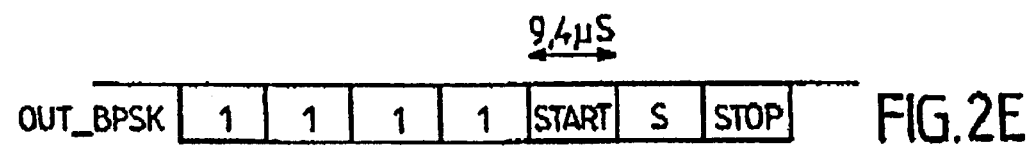
Figure 2F:

With reference to FIGS. 2E and 2F, the data emission signal OUT_BPSK (reading) is the result of in-phase modulation of the BPSK (BINARY PHASE SHIFT KEYING) type, of a subcarrier at 847.5 KHz, with a throughput of 106 kbits/s. In the absence of a message, the line OUT_BPSK is set to 1. The start bit is preceded by 4 bits set to 1. The data bit S assumes the value read on the card. If the value of the data bit is set to 1, the carrier is transmitted without change of phase, whereas if the data value bit is set to zero, the phase of the carrier is inverted.

With reference to FIG. 2F, the data bit S is equivalent to "1".

It should be noted that the signals described with reference to FIGS. 2A to 2F correspond to those of a contact-free card according to the state of the art.

Figure 3:
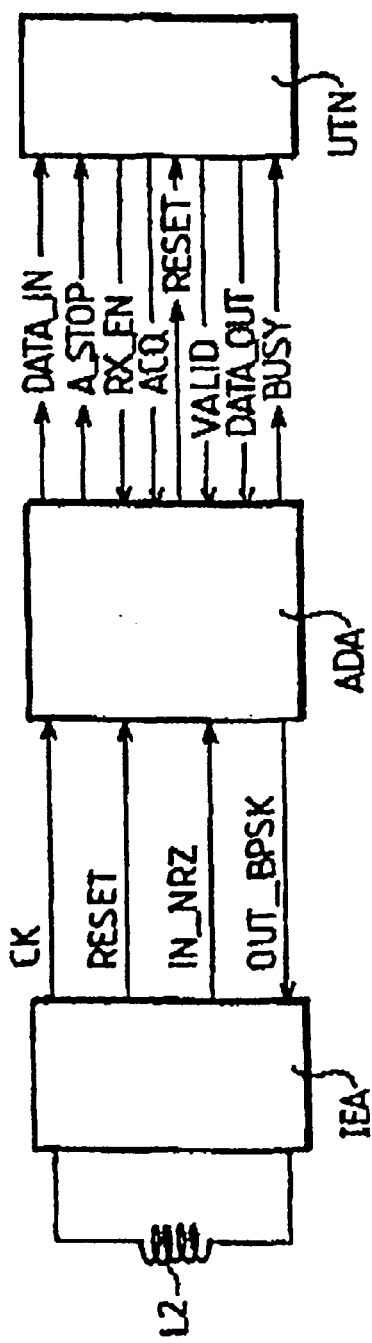
FIG. 3 shows schematically a contact-free card provided with adapter means according to the invention.

With reference to FIG. 3, adapter means ADA according to the invention carry out adaptation between the signals supplied by the radio-frequency interface IEA, and the inputs/outputs of asynchronous digital processing means UTN.

A detailed presentation of the principles of asynchronous or clock-free digital circuits is available in the document "AAAA asynchronism, adequation, algorithm, architecture", Traitement du signal (Signal processing), Volume 14, no. 6, pages 589 to 604, special 1997, M. RENAUDIN, F. ROBIN and P. VIVET.

Briefly, a clock-free digital circuit operates by means of a multiplicity of control signals, which are distributed throughout the digital circuit. These control signals assure implementation of all the exchanges of data between the elements which constitute the circuit. These control signals establish two-way communication protocols, which are commonly known as request/acknowledgement or handshake protocols.

A distinction is made between two-phase or four-phase operating-modes. These modes are of the request/acknowledgement type, insensitive to the propagation time, and clock-free.

Figure 4:
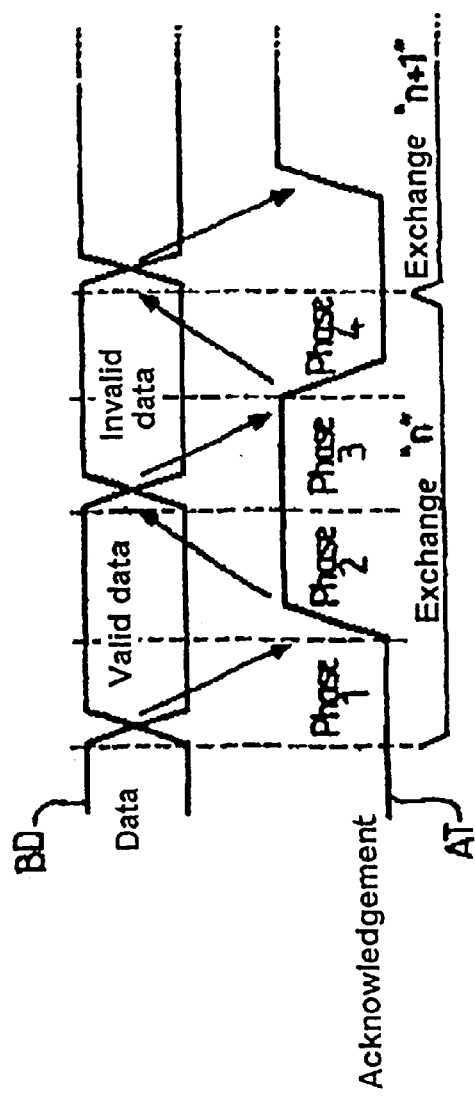
FIG. 4 shows a four-phase request/acknowledgement-type operating mode according to the state of the art.

FIG. 4 shows an operating mode with 4 phases, between an emitter and a receiver.

The receiver detects the presence of a valid datum on the data bus BD, and responds by emitting an acknowledgement AT (rising front), after having used the datum (phase 1). The emitter then places an invalid datum on the data bus BD (phase 2). The receiver responds by setting the acknowledgement signal AT to zero (phase 3). The emitter then knows that another exchange can begin, and that it can emit a valid datum onto the data bus BD (phase 4).

In the case of an operating mode of the type described with reference to FIG. 4, and data coding which corresponds to invalid and valid states, an asynchronous circuit can exchange data without reference to a single common time basis, of the type used in synchronous circuits which are timed by a global, regular clock. Functionality is assured by communication which is synchronised locally, between the elements which are connected (request/acknowledgement or handshake protocol).

The design of an asynchronous microprocessor of the 16-bit RISC type is described in the document "ASPRO 216: A Standard-Cell-Q.D.I. 16-Bit RISC Asynchronous Microprocessor", International Symposium on Advanced Research in Asynchronous Circuits and Systems, San Diego, USA, March 30–April 2, pages 22–31, 1998, M. RENAUDIN, P. VIVET, F. ROBIN.

The processor is said to be "virtually insensitive to the propagation time", since functional correction of the circuit is independent from the times at the gates and connections which constitute the circuit, with the exception of some forks, which are described as isochronous forks. It should be noted that the circuits which are virtually insensitive to the processing time are the most reliable in relation to variation of the times in the elements of the circuit. They are particularly well-suited to applications in which the operating conditions are fluctuating, such as the communications between a remote station and a smart card.

According to the invention, adapter means ADA make it possible to use asynchronous digital processing means of this type in a micro-electronic component for a portable object, with contact-free electromagnetic connection with a remote station.

Figure 5:
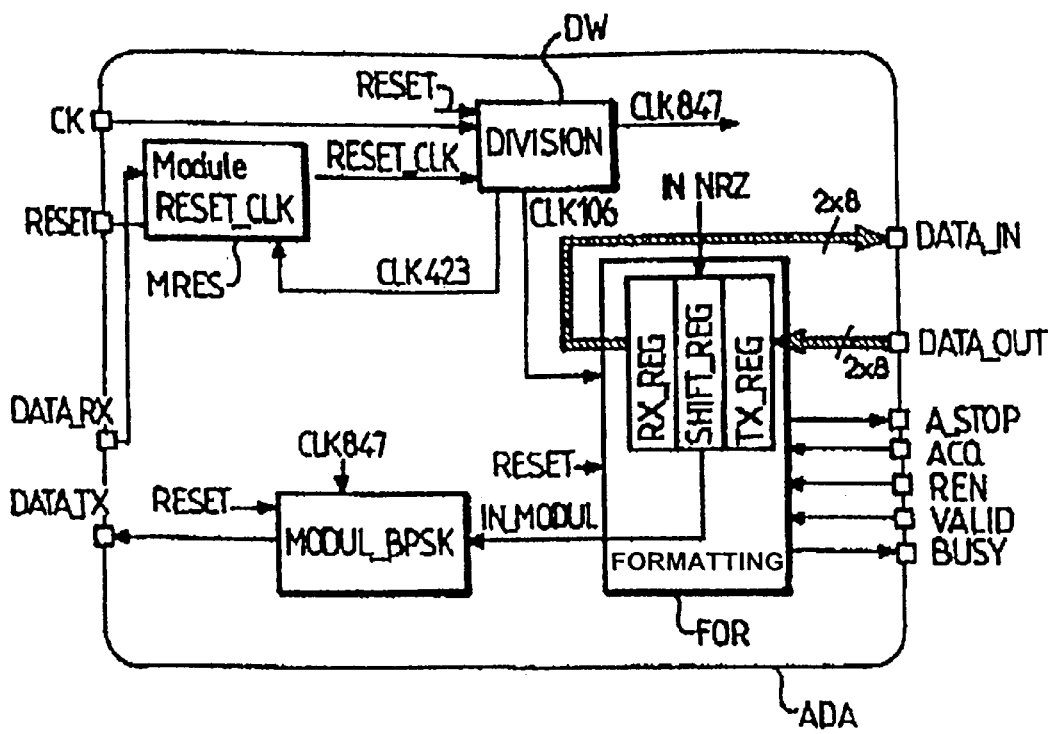
FIG. 5 shows in detail the adapter means according to the invention.
Figure 6:
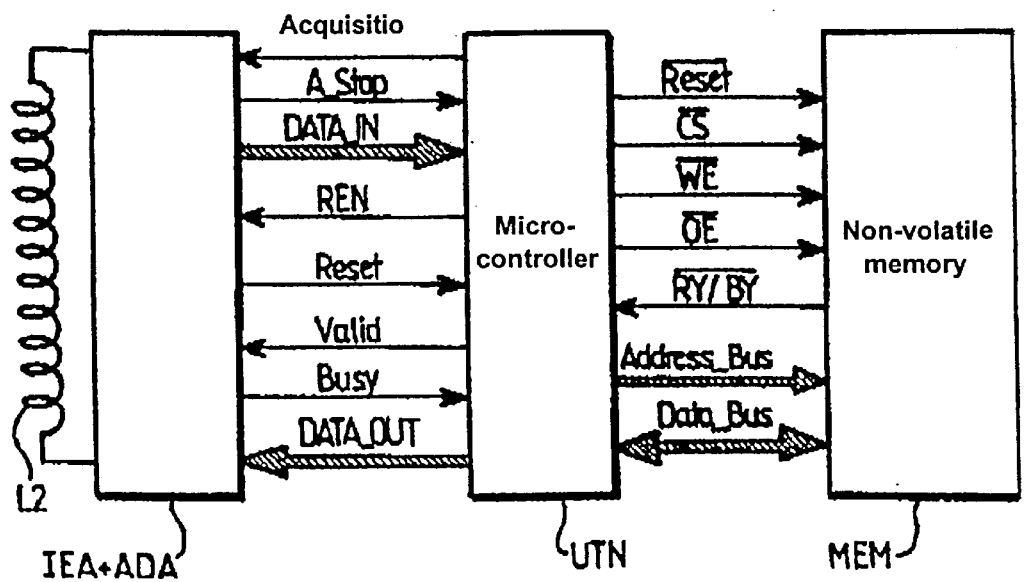
FIG. 6 represents schematically the signals applied to the digital processing means associated with a non-volatile memory, according to the invention.

With reference to FIGS. 5 and 6, the digital processing means UTN comprise a one-way parallel receiver port DATA_IN, in order to receive data emitted by the adapter means ADA, and a one-way parallel emitter port DATA_OUT, in order to emit data to the adapter means ADA.

The adapter means ADA comprise formatting means FOR, which an format the data received/emitted by the parallel receiver port DATA_IN or emitter port DATA_OUT, according to the operating mode of a request/acknowledgement type, which is substantially insensitive to the processing times, and is without a global, regular clock, such as that described with reference to FIG. 4.

The formatting means comprise a first data register TX_REG, which is connected to the parallel emitter port DATA_OUT, and a second register SHIFT_REG, which is connected to the first register TX_REG, and to the modulation module MODUL_BPSK.

In the emission mode, the formatting-means according to the operating mode of the request/acknowledgement type, as described hereinafter with reference to FIGS. 8A to 8H, can place the binary data of the emitter port DATA_OUT in the first register TX_REG, and apply in series to the second register SHIFT-REG the data obtained from the first register, in order to have these data modulated in series by the modulation module MODUL_BPSK.

The formatting means FOR additionally comprise a third data register RX_REG, which is connected to the receiver port DATA_IN, and a fourth register SHIFT_REG, which is connected to the third register RX_REG, and receives the reception signal IN_NRZ from the contact-free interface IEA.

In the reception mode, the formatting means FOR according to the operating mode of the request/acknowledgement type described hereinafter with reference to FIGS. 7A to 7K, can place the binary data of the reception signal IN_NRZ in series in the fourth register SHIFT_REG, and apply to the third register RX_REG the data obtained from the fourth register, in order to place them in the receiver port DATA_IN.

Advantageously, the second and fourth registers are grouped together in a common register SHIFT_REG.

The adapter means ADA additionally comprise dividing means DIV for the local clock signal CK at 13.5 MHz. The dividing means comprise a divider by 16, in order to supply a signal CK847 of approximately 847 KHz. This signal CK847 is applied to a divider by 2, such as to supply a signal CK423 of approximately 423 KHz, as well as another divider by 8, in order to supply a signal CK106 of approximately 106 KHz.

The divider means DIV receive the reset signal RESET, as well as the reception signal IN_NRZ, both of which are obtained from the contact-free interface IEA.

The divider means DIV are initialised by the reset signal RESET and the reception signal IN_NRZ.

The first sub-multiple of the local clock signal CK847 is designed to be used by the modulation module MODUL_BPSK. The second sub-multiple of the local clock signal CK106 is designed to time the formatting means-FOR.

A reset module MRES receives the signal RESET, the signal IN_NRZ and the signal CK423, and supplies a time-reset signal RESET_CLK, to be used by the divider means DIV.

FIGS. 7A to 7K show the transfer of data between the adapter means ADA and the processing means UTN (reception mode).

FIG. 7A shows the clock signal CK423 obtained from the divider module DIV. This clock signal is at a frequency of 423 KHz. It is applied to the module MRES, in order to reset the time of the clock signal CK106 obtained from the division module DIV.

FIG. 7B shows the clock signal CK106 obtained from the division module DIV. This signal times the formatting means FOR.

FIG. 7C shows the signal REN (enable reception) obtained from the asynchronous digital processing means UTN. This signal REN changes from the inactive state (0) to the active state (1) when the asynchronous processor UTN accepts reception of data obtained from the remote station.

FIGS. 7D and 7E show signals FLAG_BUF and TRIG_RF, which, in relation with the signal REN, make it possible to initialise the radio-frequency reception-of the data.

FIG. 7F shows the state of the signal DATA_RX, which corresponds to the signal IN_NRZ described with reference to 2D.

In FIG. 7G, the signal which forms the data request A_STOP destined for the processing means UTN, changes from the inactive state (0) to the active state (1), in response to a valid binary datum at the receiver port DATA_RX. In this case, the valid datum is represented by the stop bit of the byte to be received.

In FIG. 7H, the register SHIFT_REG changes from one byte (byte N) to another (byte N+1), at the descending front of the signal A_STOP.

In FIG. 7I, the register RX_REG recovers the byte N, bit by bit, at the rising front of the signal A_STOP.

In FIG. 7J, the parallel receiver port DATA_IN recovers the byte N, with a delayed clock stroke CK106.

In FIG. 7K, the signal ACQ which constitutes acknowledgement of data obtained from the processing means UTM, changes from the inactive state (0) to the active state (1), after the valid binary datum has been used.

In FIG. 7G, the signal A_STOP which constitutes a request for data, changes from the active state (1) to the inactive state (0), in the presence of invalid binary data at the parallel receiver port DATA_IN.

In FIG. 7K, the signal ACQ which constitutes an acknowledgement of data, changes from the active state (1) to the inactive state (0), in the absence of use of a valid binary datum.

FIGS. 8A to 8H show the transfer of data between the processing means and the adapter means (emission mode).

FIG. 8A shows the signal REN (enable reception) emitted by the asynchronous digital processing means UTN. This signal REN changes from the active state (1) to the active state (0), when the asynchronous microprocessor UTN accepts emission of data to the remote station.

FIG. 8B shows the state of the parallel emitter port DATA_OUT, of the microprocessor UTN.

FIG. 8C shows the state of the register TX_REG.

FIG. 8D shows the state of the register SHIFT_REG.

FIG. 8E shows the line DATA_TX, which corresponds to the signal OUT_BPSK, described with reference to FIG. 2F.

In FIG. 8F, the signal VALID, which constitutes a request for data destined for the adapter means, changes from the inactive state (0) to the active state (1), in response to a valid binary datum at the emitter port DATA_OUT.

In FIG. 8G, the signal BUSY, which constitutes an acknowledgement of data obtained from the adapter means ADA, changes from the inactive state (0) to the active state (1), after the valid binary datum has been used.

In FIG. 8F, the signal VALID, which constitutes a request for data, changes from the active state to the inactive state, in the presence of invalid binary data at the emitter port DATA_OUT.

In FIG. 8G, the signal BUSY, which constitutes an acknowledgement of data, changes from the active state to the inactive state, in the absence of use of a valid binary datum.

FIG. 8H represents the signal FLAG_BUF, which changes from the inactive state (0) to the active state, in response to an active register.

It is apparent that the asynchronous communication protocol according to the invention, as described in FIGS. 7 and 8, can be put into place in accordance with signals other than those described in the present invention.

With reference to FIG. 6, the contact-free card is advantageously equipped with a memory MEM of the EEPROM type (non-volatile, re-writable memory). In order to work with a memory MEM of this type, the signals for the asynchronous processing means generally comprise a reset signal RESET, a selection signal CS (chip select), a writing signal WE (write enable), a reading signal OE, a signal RY/BY, a one-way address bus (Address_bus), and a two-way data bus (Data Bus).

What is claimed is:

1. A micro-electronic component for a portable object comprising:
   a contact-free interface for electromagnetic coupling with a remote station;
   an asynchronous processing unit capable of processing input and output data signals for exchange with the remote station; and
   an adapter interposed between the contact-free interface and the processing unit capable of adapting the input and output data signals, wherein said adapter is capable of exchanging control signals with the asynchronous processing unit, and said control signals comprising a request state before the exchange of a data block and an acknowledgment state after the exchange of a data block to control the exchange of data signals between the asynchronous processing unit and the contact-free interface wherein the asynchronous processing unit comprises a one-way parallel receiver port for receiving data emitted by the adapter, and a one-way parallel emitter port for emitting data to the adapter, the adapter comprises a formatting unit to format the data received/ emitted by the parallel receiver port or emitter port and the formatting unit comprises:

a first data register coupled to the parallel emitter port, a second register coupled to the first register, and to a modulation module, said formatting unit according to an operating mode of the request/ acknowledgement being able to place the binary data of the emitter port in the first register, and apply in series to the second register the data obtained from the first register to have these data modulated in series by the modulation module.

2. The component according to claim 1, wherein the formatting unit further comprises:

a third data register connected to the receiver port, a fourth register connected to the third register, and receives the reception signal from the contact-free interface, said formatting unit being able to place the binary data of the reception signal in series in the fourth register, and apply to the third register the data obtained from the fourth register, in order to place them in the receiver port.

3. The component according to claim 2, wherein the modulation module comprises:

a first input, which receives the first sub-multiple of the local clock signal, a second input, which receives the data signal obtained from the formatting unit, and an output, which emits a binary sequence corresponding to the emission signal the bit time of which is equivalent to the period of the second sub-multiple of the local clock signal, and the binary coding of which is provided by phase modulation of the first submultiple of the local clock signal.

4. A micro-electronic component for a portable object comprising:

a contact-free interface for electromagnetic coupling with a remote station;

an asynchronous processing unit capable of processing input and output data signals for exchange with the remote station; and an adapter interposed between the contact-free interface and the processing unit capable of adapting the input and output data signals, wherein said adapter is capable of exchanging control signals with the asynchronous processing unit, and said control signals comprising a request state before the exchange of a data block and an acknowledgment state after the exchange of a data block to control the exchange of data signals between the asynchronous processing unit and the contact-free interface, wherein the adapter additionally comprises a divider for a local clock signal with:

a first input, which receives the local clock signal obtained from the contact-free interface, a second input, which receives a reset signal obtained from the contact-free interface, a third input, which receives a reception signal obtained from the contact-free interface, a first output, which emits a first sub-multiple of the local clock signal and a second output, which emits a second sub-multiple of the local clock signal, the divider being initialized by the reset signal and the reception signal, the first sub-multiple of the local clock signal being used by a modulation module, and the second sub-multiple of the local clock signal times the formatting unit.

\* \* \* \* \*

UNITED STATES PATENT AND TRADEMARK OFFICE
CERTIFICATE OF CORRECTION

PATENT NO. : 6,622,922 B1
DATED : September 23, 2003
INVENTOR(S) : Andre Abrial et al.

It is certified that error appears in the above-identified patent and that said Letters Patent is hereby corrected as shown below:

Title page,
Item [75], Inventors, delete "André Adrial", insert -- André Abrial --
Item [56], References Cited, OTHER PUBLICAITONS, delete;
"Men, "Design of Closck-Free Asynchronous System for Real-Time Signal Processing", 1989. ICASSP-89., 1989 International Conference on, May 23-26, 1989, pp. 25332-2535 vol. 4.*", insert -- Men, "Design of Clock-Free Asynchronous System for Real-Time Signal Processing", 1989. ICASSP-89., 1989 International Conference on, May 23-26, 1989, pp. 2532-2535 vol. 4. * --
delete; "J. Bouvier et al., "A Smart Card SMOS Circuit with Magnetic Power and Communications Interface", IEEE International Solid State Circuits Conference, 1997, pp. 296-297, ISSCC97/Session 17/TD:Low-Power/LowVoltage Circuits/Papers SA 17.6", insert -- J. Bouvier et al., "A Smart Card SMOS Circuit with Magnetic Power and Communications Interface", IEEE International Solid State Circuits Conference, 1997, pp. 296-297, ISSCC97/Session 17/TD:Low-Power/Low-Voltage Circuits/Papers SA 17.6 --

Drawings,
FIG. 6, Sheet 3 of 5, delete "Acquisitio", insert -- Acquisition --

Column 10,
Line 3, delete "submultiple", insert -- sub-multiple --

Signed and Sealed this

Eighth Day of February, 2005

JON W. DUDAS
*Director of the United States Patent and Trademark Office*